(12) United States Patent  
Nankervis et al.

(10) Patent No.: US 7,841,633 B2  
(45) Date of Patent: Nov. 30, 2010

(54) PACKAGE PICK-OFF AND DELIVERY DEVICE

(75) Inventors: Wayne Thomas Nankervis, Hortonville, WI (US); Kenneth Eugene Nowak, Green Bay, WI (US); Paul Edward Wegner, New London, WI (US)

(73) Assignee: Curwood, Inc., Oshkosh, WI (US)

( * ) Notice: Subject to any disclaimer, the term of this patent is extended or adjusted under 35 U.S.C. 154(b) by 379 days.

(21) Appl. No.: 12/100,637

(22) Filed: Apr. 10, 2008

(65) Prior Publication Data

US 2009/0256371 A1 Oct. 15, 2009

(51) Int. Cl.
*B25J 15/06* (2006.01)

(52) U.S. Cl. ...................................... 294/64.1
(58) Field of Classification Search ............. 294/64.1, 294/64.2, 64.3, 65; 414/737
See application file for complete search history.

(56) References Cited

U.S. PATENT DOCUMENTS

| | | | | |
|---|---|---|---|---|
| 3,720,433 | A | * | 3/1973 | Rosfelder ................... 294/64.1 |
| 5,566,718 | A | * | 10/1996 | Nagai et al. ................. 294/64.1 |
| 5,707,094 | A | * | 1/1998 | Gower ....................... 294/64.1 |
| 6,860,531 | B2 | * | 3/2005 | Sherwin ..................... 294/64.1 |
| 6,979,032 | B2 | * | 12/2005 | Damhuis .................... 294/64.1 |

FOREIGN PATENT DOCUMENTS

GB 2191468 * 12/1987

* cited by examiner

*Primary Examiner*—Paul T Chin
(74) *Attorney, Agent, or Firm*—Tom J. Hall

(57) ABSTRACT

A article-handling device includes a means of rotation, a vacuum conduit, and a first vacuum manifold, each rotatably mounted onto a stationary support shaft. The device further includes a second vacuum manifold affixed to the first vacuum manifold and a non-rotatable control valve which is operational synchronized with the rotation means to provide both vacuum pressure and atmospheric pressure independently to each of the first and second vacuum manifolds. Each of the vacuum manifolds comprises one or more tubular suction shafts each having a suction cup affixed thereto. The suction shafts of each vacuum manifold are spatially arranged such that at least a first suction shaft of the first vacuum manifold is substantially parallel to a first suction shaft of the second vacuum manifold thereby enabling the suction shafts to function as a paired unit. In this way, at least the first suction shaft of said first vacuum manifold and the first suction shaft of said second vacuum manifold are each independently adapted to attract and hold said article when the first and second vacuum manifolds are operationally connected with said vacuum pressure and release said article when the first and second vacuum manifolds are operationally connected with said atmosphere pressure.

30 Claims, 4 Drawing Sheets

PACKAGE PICK-OFF AND DELIVERY DEVICE

TECHNICAL FIELD

This invention relates to an article-handling apparatus suitable for use with packaging machines and, more particularly, to an apparatus for transferring flexible packages from and to a plurality of predetermined locations.

BACKGROUND OF THE INVENTION

It has become increasingly necessary and desirable in packaging operations to enable the pick-up, transfer and delivery of packaged articles of various shapes and dimensions in the most reliable, precise and high-speed manner. Many types of such devices have been developed, including the utilization of rotary transfer devices having a vacuum system. Generally, the rotary transfer device functions in cooperation with a vacuum source to pickup, hold and place the packaged product during transfer. Typically, vacuum suction cups of the rotary transfer device engage an article at a predetermined location and for a predetermined period, and then, disengage the article after transfer from one location to another. However, due to the many configurations, shapes, and sizes of packaged articles required to be transferred and processed, it has become increasingly difficult for manufacturers to use suitable transfer mechanisms which enable the reliable pickup, transfer, and placement of these articles. Despite the various rotary transfer mechanisms known in the art, shortcomings and limitations still exist. For example, during the transfer of a packaged product, engagement with the package may be incomplete, thus, causing a failure in the subsequent transfer and placement processes. Generally, this type of malfunction results from a loss of vacuum pressure or suction in the entire vacuum system. Loss of suction can be caused by incomplete surface contact between an individual suction cup and the article to be transferred. In general, suction cups are designed such that the internal pressure or inside the suction cup can be lowered by evacuation, and thus, create the negative pressure or lifting force (suction) needed to secure it to the object to be handled. However, because suction cups are often of a lightweight and rather pliable material, e.g., rubber, and the surface of an article can be textured or irregular, gaps may exist between the suction cup and the article which allows ambient atmosphere to leak into the suction cup cavity. Leakage of air into the suction cup cavity depletes the internal vacuum pressure and consequently, limits the lifting force that can be generated. Typically, the leakage of one suction cup affects the vacuum pressure in an entire system, leaving other suction cups without adequate suction and lifting force. Leakage is particularly a problem with irregularly shaped products packaged in flexible packaging materials which has a greater tendency to have textured and uneven surfaces.

Loss of vacuum pressure can also occur when there is internal structural damage to vacuum system components due to repetitive high speed motion of the rotary transfer device. Typically, these components include one or more metallic solder joints, and over time, the solder cracks due to metal fatigue and subsequently, air leaks into the component and results in the loss of vacuum pressure.

Thus, it is an object of the present invention to overcome the shortcomings and limitations of conventional rotary transfer devices or apparatus.

It is also an object of the present invention to provide an article-handling device with the added benefit of a vacuum system which will prevent malfunction during article transfer due to the leakage of air at one or more suction cups.

It is still further an object of the present invention to provide an article-handling device with the added benefit of a means for distributing vacuum pressure independently to at least two tubular suction shafts to prevent the malfunction during article transfer due to the leakage of air at one or more suction cups.

It is also an object of the present invention to provide an article-handling device having the added benefit of a means for distributing vacuum pressure independently to at least two tubular suction shafts with enhanced structural integrity to prevent the malfunction during article transfer due to loss of vacuum pressure.

It is yet another object of the present invention to provide a more reliable and robust article-handling device for packaging machines, particularly, flexible packaging machines.

BRIEF SUMMARY OF THE INVENTION

These as well as other objects are achieved by an article-handling device for packaging machines which includes a) a vacuum source providing a vacuum pressure; b) a stationary support shaft having a central axis; c) a first vacuum manifold rotatably mounted on the support shaft and having one or more tubular suction shafts; d) a second vacuum manifold rotatably affixed to the first vacuum manifold and having one or more second tubular suction shafts; e) a stationary control valve mounted on the support shaft and adapted to i) receive and distribute the vacuum pressure from the vacuum source independently to the first and second vacuum manifolds, and ii) provide connectivity with the atmosphere; f) a monolithic vacuum conduit mounted on the support shaft and providing separate operational connectivity between i) the first vacuum manifold and the control valve, and ii) the second vacuum manifold and the control valve; g) a means for rotating each of the first and second vacuum manifolds, and conduit about the support shaft; whereby a first suction shaft of the first vacuum manifold and a second suction shaft of the second vacuum manifold are each independently adapted to attract and hold an article when operationally connected with the vacuum pressure and release the article when operationally connected with atmospheric pressure.

A variety of additional advantages of the invention will be set forth in part in the description which follows, and in part will be obvious from the description, or may be learned by practice of the invention. The advantages of the invention will be realized and attained by means of the elements and combinations particularly pointed out in the claims. It is also to be understood that both the foregoing general description and the following detailed description are exemplary and exemplary only and are not restrictive of the invention as claimed.

BRIEF DESCRIPTION OF SEVERAL VIEWS OF THE DRAWINGS

The accompanying drawings, which are incorporated in and constitute a part of this specification, illustrate several embodiments of the invention and together with the description, serve to explain the principles of the invention. A brief description of the drawings is as follows.

DETAILED DESCRIPTION OF THE INVENTION

Reference will now be made in detail to exemplary embodiments of the present invention which are illustrated in the accompanying drawings. Whenever possible, the same reference numbers will be used throughout the drawings to refer to the same or like parts.

Figure 1:
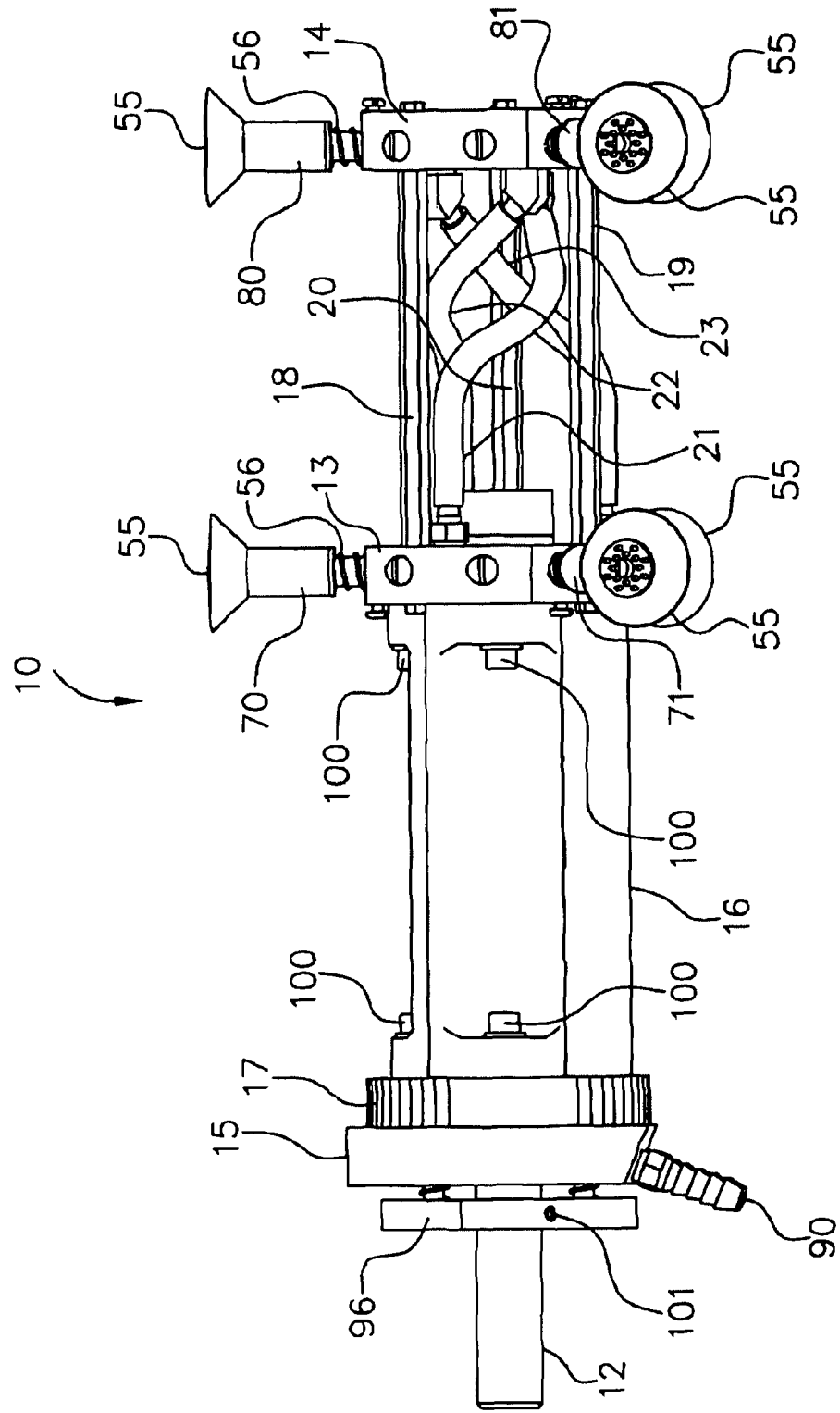
FIG. 1 is a side view of one embodiment of the article-handling device in accordance with the present invention.
Figure 4:
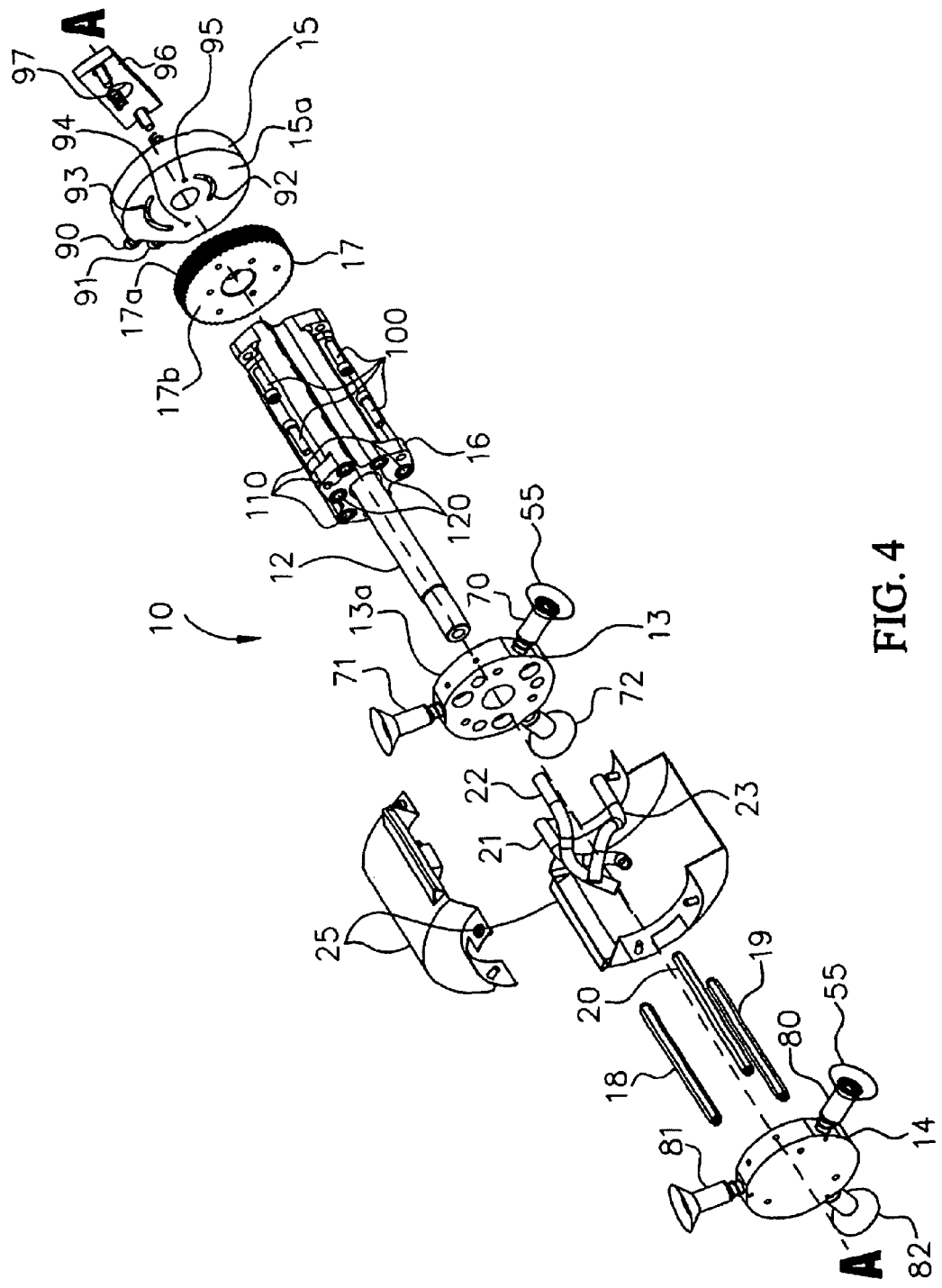
FIG. 4 is an exploded view of one embodiment of the article-handling device in accordance with the present invention.

FIGS. 1 and 4 depict one embodiment of the article-handling device 10 for use in packaging machines in accordance with the present invention. Article-handling device 10 is shown as having a longitudinal stationary support shaft 12. The support shaft 12 is generally of a metal construction having a central axis, denoted as A-A. Support shaft 12 may be held stationary to a frame structure (not shown) of the packaging machine so as to not rotate. Although not shown in the drawings, the frame structure can be constructed in a variety of configurations for installation in conjunction with a variety of mechanized operations associated with packaging equipment and packaging machines. In one embodiment, the configuration may include the frame structure as part of a drive assembly (not shown) which is operationally connected to the article-handling device 10. In another embodiment, the drive assembly may further include a mechanism which allows the article-handling device 10 to move in one or more directions. For example, article-handling device 10 may include a drive mechanism which permits the device to oscillate or swing back and forth to facilitate the transfer of an article from one location to another.

Mounted on the support shaft 12 are the control valve 15, the vacuum conduit 16, the first vacuum manifold 13, and the means for rotating, 17, the conduit 16 and the first vacuum manifold 13 around shaft 12. It will be appreciated that the second vacuum manifold 14 is affixed to the first vacuum manifold 13 by the use of rigid spacer members, 18, 19 and 20 which positions the second vacuum manifold 14 at a distal end of support shaft 12 and laterally apart from the first vacuum manifold 13. This mechanical connection of second vacuum manifold 14 to the first vacuum manifold 13 permits simultaneous rotation of the second vacuum manifold 14 with the first vacuum manifold 13 around the support shaft axis A-A by rotation means 17 as seen in FIG. 4.

The first and second vacuum manifolds, 13 and 14 are each independently and operatively connected to the control valve 15 through both the rotation means 17 and vacuum conduit 16. The vacuum manifolds, 13 and 14, each comprise one or more tubular suction shafts which extend outwardly from the manifold hub and are aligned perpendicular to the support shaft axis A-A. For example, the first vacuum manifold 13 may include the suction shafts 70, 71 and 72, and the second vacuum manifold 14 may comprise the suction shafts 80, 81 and 82. Preferably, the suction shafts of each vacuum manifold are connected internally within the manifold. The suctions shafts 70, 71, 72, 80, 81 and 82 may each have any length and width as desired, and preferably, each have identical lengths and widths. A first suction shaft, 70 from the first vacuum manifold 13 may be positioned substantially parallel to a first suction shaft, 80 from the second vacuum manifold 14 such that both are horizontal with a plane (not shown) extending outwardly from and aligned perpendicular to the support shaft axis A-A. This spatial arrangement enables the tubular suction shafts, 70 and 80 to function as a paired unit to simultaneously and independently attract and hold an article, and then to transfer the article from one location to another by rotation concentrically about the support shaft axis A-A. Further, a second suction shaft, 71 from the first vacuum manifold 13 may be aligned substantially parallel with a second suction shaft, 81 of the second vacuum manifold 14, such that suction shaft 71 and 81 serve to function as a paired unit to engage an article. Further still, a third suction shaft, 72 of the first vacuum manifold 13 may be aligned substantially parallel with a third suction shaft 82 of the second vacuum manifold 14 such that suction shafts 72 and 82 function as a paired unit to engage an article. It will be appreciated that if partial or complete vacuum pressure is lost in one of the paired suction shafts, due to, for example, leakage of air into the suction cup cavity, the other suction shaft will maintain contact with the article and thus, prevent a malfunction during the transfer.

Preferably, each suction shaft includes a suction cup, 55. As depicted in FIG. 1, each suction shaft includes a spring 56 positioned the vacuum manifold and suction cup 55 which permits each suction cup vertical motion relative to the vacuum manifold. It will be appreciated that the vertical motion of each suction cup permits at least one suction shaft from each vacuum manifold to simultaneously engage the surface of an article even when that surface is irregular or uneven.

The first vacuum manifold 13 may include a first and second plurality of inlet holes (both not shown) located on a first outer surface 13a of the first vacuum manifold 13. The first plurality of inlet holes may be aligned with the first plurality of channels 110 of conduit 16 (see FIG. 2) and permit a vacuum pressure or atmospheric pressure to flow to enter first vacuum manifold 13. The second plurality of inlet holes are aligned with the second plurality of channels 120 of conduit 16 (see FIG. 2) and permit a vacuum pressure or atmospheric pressure to flow through first vacuum manifold 13 and into the second vacuum manifold 14 via flexible tubular communication members 21, 22 and 23.

As depicted in FIG. 4, the article-handling apparatus 10 may also include a rigid or semi-rigid envelope member 25 having a generally cylindrical shape which surrounds the space between the first and second vacuum manifolds 13 and 14 and insulates tubular communication members 21, 22 and 23.

It is also contemplated within the scope of this invention that the article-handling device 10 may include three or more vacuum manifolds whereby each manifold includes one or more articulated suction shafts. In this embodiment, the suction shafts may be arranged spatially to form a set of three, four, five or more suction shafts which function as a unit to simultaneously and independently engage an article.

The control valve 15 is directly operative on the first and second vacuum manifolds 13 and 14 to provide timed and synchronized independent vacuum pressure and atmospheric pressure. Preferably, the control valve 15 is operational synchronized with the rotation means 17 such that vacuum pressure and atmospheric pressure is provided independently to each of the first and second vacuum manifolds 13 and 14 by the simultaneous rotation of the rotation means 17, vacuum conduit 16 and the first and second vacuum manifolds 13 and 14. Although not specifically shown in the drawings, it will be understood that control valve 15 is operationally connected to a vacuum source (not shown). Control valve 15 is adapted to receive vacuum pressure from the vacuum source and distribute vacuum pressure separately and independently to each of the first and second vacuum manifolds 13 and 14, and is further adapted to provide communication with atmospheric pressure. Preferably, the vacuum pressure and atmospheric pressure is distributed separately and independently to each of the first and second vacuum manifolds 13 and 14 through the rotation means 17 and vacuum conduit 16.

As depicted in FIGS. 1 and 4, the control valve 15 is mounted on support shaft 12 and may be held stationary by the use of a block and pin assembly 96 which is held by screw 101 to support shaft 12. The control valve 15 may be forced toward rotation means 17 by means of a spring 97 positioned between block and pin assembly 96 and control valve 15. Control valve 15 may include one or more vacuum supply ports, 90 and 91 which permit connection to the vacuum source such as, for example, a vacuum pump. The control valve 15 may comprise any suitable material having low friction properties, for example, Teflon®, nylon or similar materials, and will slide against the rotation means 17. The control valve 15 is provided with two slot shaped apertures 92 and 93 which open to the surface 15a of the control valve 15, which in turn mates in a surface-to-surface configuration with the surface 17a of the rotation means 17. Each slot shaped aperture, 92 and 93 is open through individual internal channels within control valve 15 to the source of vacuum pressure via the vacuum supply fittings 90 and 91, respectively. Although not specifically shown in the drawings, rotation means 17 is connected to a drive assembly which may include, for example, a motor and a variety of gear/chain mounted to a frame structure, a timing mechanism or similar mechanisms. The control valve 15 is further provided with two axially extending holes 94 and 95 which merely pass through the control valve 15 and allow access to the atmosphere.

Figure 2:
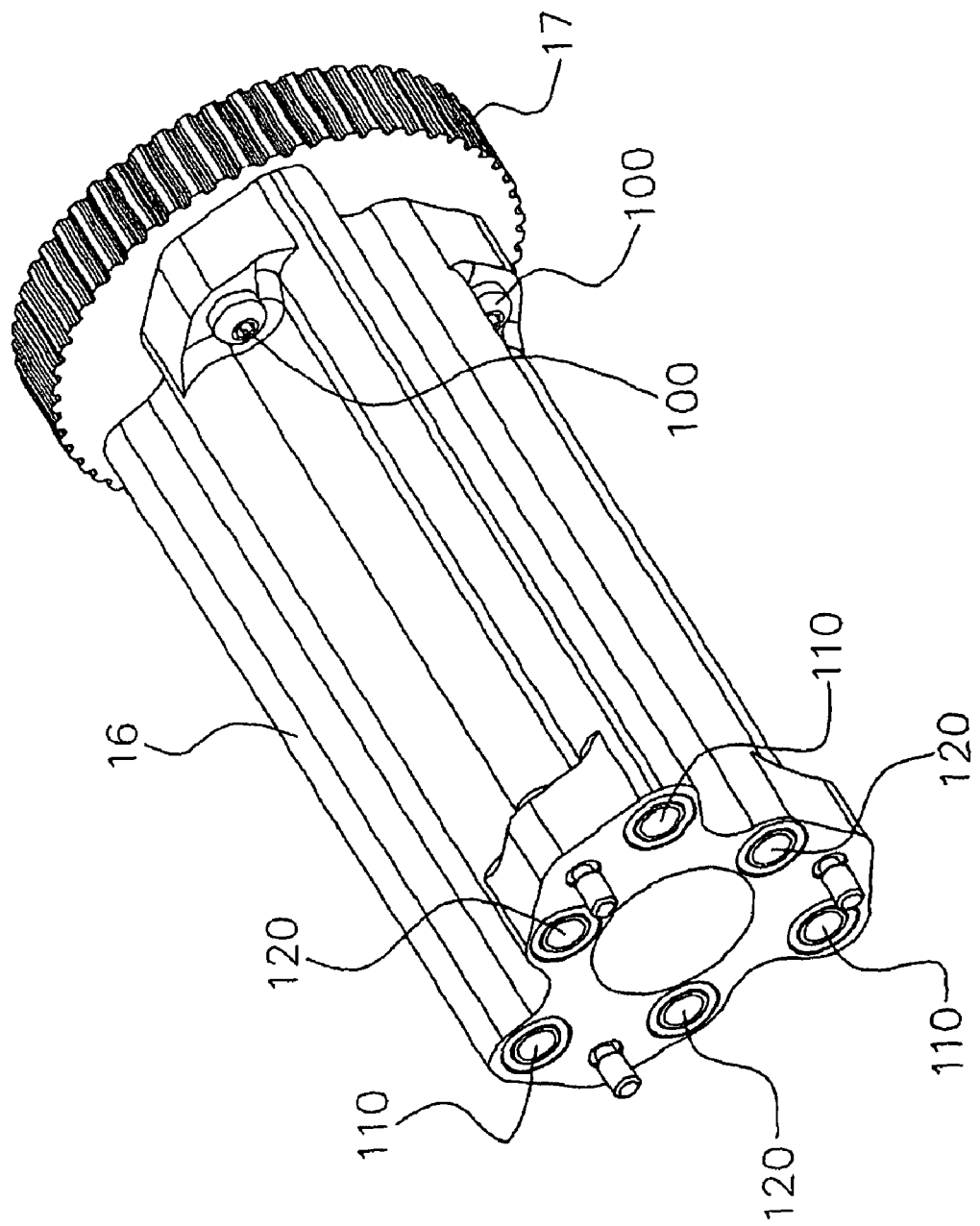
FIG. 2 is a perspective view of one embodiment of the monolithic vacuum conduit and means for rotation in accordance with the present invention.
Figure 3:
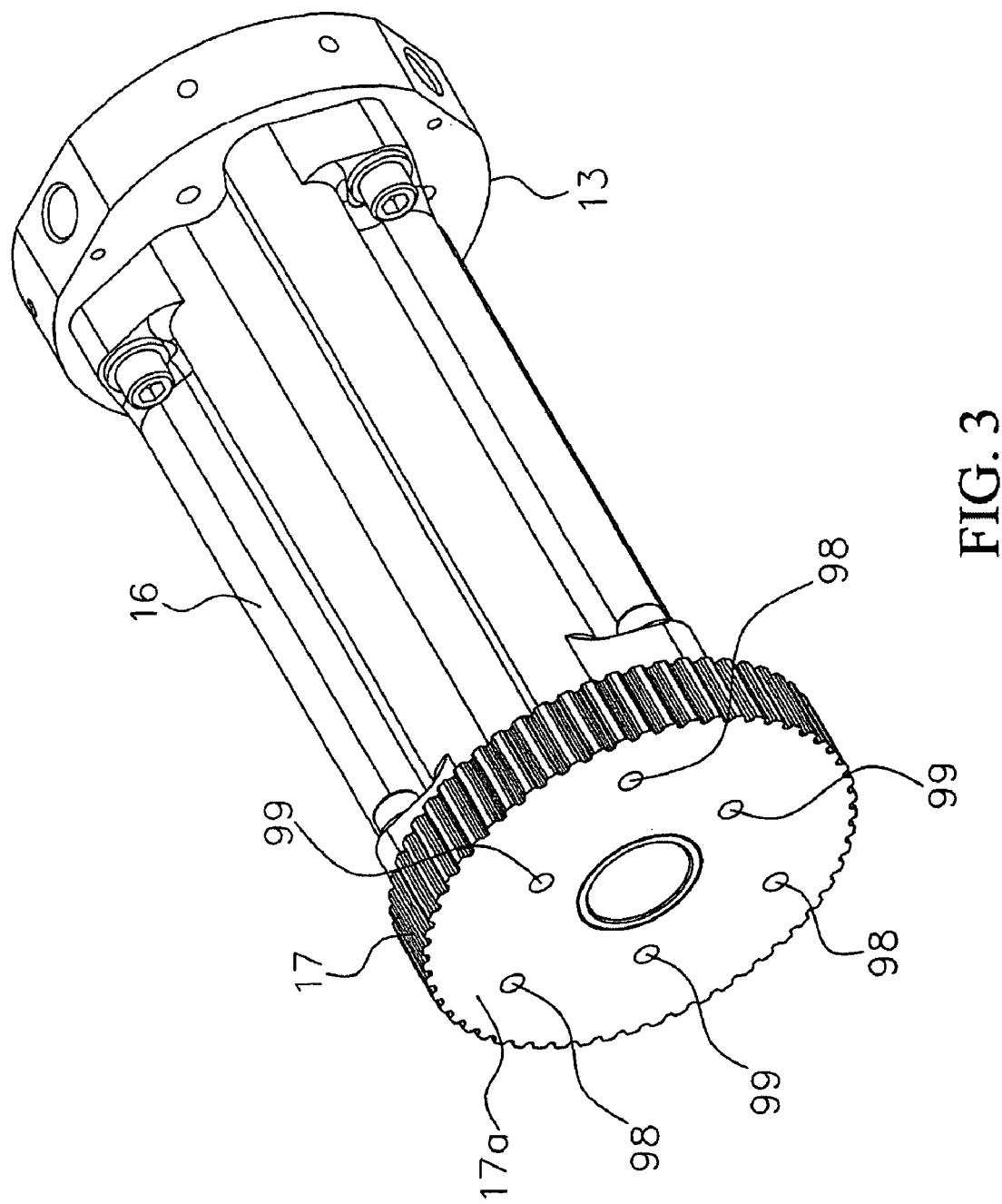
FIG. 3 is another perspective view of one embodiment of the monolithic vacuum conduit and means for rotation in accordance with the present invention.

Rotation means 17 is rotatably mounted on the support shaft 12 and positioned between and in a surface-to-surface contact arrangement with both control valve 15 and vacuum conduit 16. As depicted in FIG. 2, rotation means 17 may comprise a sprocket wheel which will rotate around support shaft 12 when operationally connected by a chain or belt to a drive assembly (not shown). In FIG. 3, rotation means 17 is provided with a first plurality holes 98 and a second plurality of holes 99, both of which pass through the interior of the rotation means from a first outer surface 17a to an opposite second out surface 17b. As shown in FIG. 4, it may be desirable to have the plurality of holes 98 periodically aligned by rotation of the rotation means 17 with the vacuum pressure carrying aperture 93 of the control valve 15 (i.e., the holes and apertures are on the same radius), and the plurality of holes 99 periodically aligned by rotation of the rotation means 17 with the vacuum pressure carrying aperture 92 such that independent vacuum pressures may be introduced into the vacuum conduit 16. It may be further desirable to have the plurality of holes 98 periodically aligned by rotation of the rotation means 17 with the atmosphere carrying hole 94 of the control valve 15, and the plurality of holes 99 periodically aligned by rotation of the rotation means 17 with the atmosphere carrying hole 95 of the control valve 15 such that independent atmospheric pressures may be introduced into the vacuum conduit 16.

Vacuum conduit 16 as shown in FIG. 4 is rotatably mounted on the support shaft 12 and coaxially aligned with the support shaft axis A-A. Preferably, the vacuum conduit 16 is positioned between and in a surface-to-surface contact arrangement with both rotation means 17 and first vacuum manifold 13, and secured therebetween by the use of bolts 100. In this way, when rotation means 17 rotates around support shaft 12, vacuum conduit 16, first vacuum manifold 13 and second vacuum manifold 14 will simultaneously rotate in the same direction as rotation means 17. Vacuum conduit 16 is a rigid monolithic component having a generally cylindrical shape which may be formed from a polymeric material or non-polymeric material. Suitable polymeric materials may include carbon fiber, ultra-high density polyethylene, and polyacetal, also known as acetal resin or polyoxymethylene. Suitable non-polymeric materials may include stainless steel and like materials.

As shown in FIG. 2, the vacuum conduit 16 may comprise a first plurality of channels 110 and a second plurality of channels 120, wherein each channel extends through the interior of the conduit. Preferably, the first plurality of channels 110 are aligned with the first plurality of holes 98 of the rotation means 17 thus allowing either vacuum pressure from aperture 93 or atmospheric pressure from hole 94 to flow into the second vacuum manifold 14 as depicted in FIG. 4. Preferably, the second plurality of channels 120 are aligned with the second plurality of holes 99 of the rotation means 17 thus allowing vacuum pressure from aperture 92 or atmospheric pressure from hole 95 to flow into the first vacuum manifold 13 depicted in FIG. 4. Although not shown in the drawings, it is further desirable to include a compressible o-ring or gasket axially aligned with each channel of the first and second pluralities of channels 110 and 120. Preferably, the o-rings or gaskets are positioned between surface 13a of the first vacuum manifold 13 and the vacuum conduit 16, and surface 17b of rotation means 17 and the vacuum conduit 16 thereby providing an air-tight seal at each interface therebetween.

Article-handling device 10 may include flexible tubular communication members 21, 22 and 23 provided between the first vacuum manifold 13 and the second vacuum manifold 14 to provide vacuum pressure or atmospheric pressure from the vacuum conduit 16 to the second vacuum manifold 14.

In order to facilitate the rotation of the rotary mounted components on the support shaft 12, the article-handling device 10 may include bearings (not shown) mounted on the support shaft 12, preferably located between the first vacuum manifold 13 and support shaft 12, and rotation means 17 and support shaft 12.

In accordance with the present invention, article-handling device 10 is particularly suitable for use with packaging equipment, packaging machines using flexible packaging materials, and packaging machines using flexible packaging materials for packaging of food products, such as fresh and processed meats. When used in a packaging machine application, article-handling device 10 may operate by picking a package from a die cavity and placing it into a package delivery chute.

It will be apparent to those skilled in the art that modifications and additions can be made to the various embodiments described above, without departing from the true scope and spirit of the present invention. It should be understood that this invention is not intended to be unduly limited by the illustrative embodiments set forth herein and that such embodiments are presented by way of example only with the scope of the invention intended to be limited only by the claims set forth herein as follows.

The invention claimed is:

1. An article-handling device, comprising:
   a) a vacuum source providing a vacuum pressure;
   b) a stationary support shaft having a central axis;
   c) a first vacuum manifold rotatably mounted on said support shaft and comprising one or more tubular suction shafts;
   d) a second vacuum manifold rotatably affixed to said first vacuum manifold and comprising one or more tubular suction shafts;

e) a stationary control valve mounted on said support shaft and adapted to i) receive and distribute said vacuum pressure independently to said first and second vacuum manifolds, and ii) provide connectivity with atmospheric pressure;

f) a monolithic vacuum conduit rotatably mounted on said support shaft and providing separate operational connectivity between i) said first vacuum manifold and said control valve, and ii) said second vacuum manifold and said control valve;

g) a means for rotating each of said first and second vacuum manifolds, and said conduit about said support shaft; and wherein at least a first suction shaft of said first vacuum manifold is arranged spatially parallel to a first suction shaft of said second vacuum manifold thereby enabling each to independently attract and hold said article when said first and second vacuum manifolds are operationally connected with said vacuum pressure and release said article when said first and second vacuum manifolds are operationally connected with said atmosphere pressure.

2. The device in accordance with claim 1 further comprising a second suction shaft of said first vacuum manifold and a second suction shaft of said second vacuum manifold, wherein said second suction shaft of said first vacuum manifold is positioned substantially parallel to said second suction shaft of said second vacuum manifold thereby enabling each to independently attract and hold said article when said first and second vacuum manifolds are operationally connected with said vacuum pressure and release said article when said first and second vacuum manifolds are operationally connected with said atmosphere pressure.

3. The device in accordance with claim 1 further comprising a third suction shaft of said first vacuum manifold and a third suction shaft of said second vacuum manifold, wherein said third suction shaft of said first vacuum manifold is positioned substantially parallel to said third suction shaft of said second vacuum manifold thereby enabling each to independently attract and hold said article when said first and second vacuum manifolds are operationally connected with said vacuum pressure and release said article when said first and second vacuum manifolds are operationally connected with said atmosphere pressure.

4. The device in accordance with claim 1 wherein said rotation means is operationally synchronized with said control valve.

5. The device in accordance with claim 1 wherein said conduit comprises at least a first channel through the interior of said conduit, and at least a second channel through the interior of said conduit.

6. The device in accordance with claim 1 wherein said conduit comprises a first plurality of channels through the interior of said conduit, and a second plurality of channels through the interior of said conduit.

7. The device in accordance with claim 1 wherein conduit comprises a rigid polymeric material.

8. The device in accordance with claim 1 wherein said rotation means is positioned between and in a surface-to-surface contact arrangement with both said control valve and said conduit.

9. The device in accordance with claim 1 wherein said rotation means comprises a first plurality of holes through the interior of said rotation means, and a second plurality of holes through the interior of said rotation means.

10. The device in accordance with claim 1 wherein said rotation means comprises a sprocket wheel.

11. The device in accordance with claim 1 further comprising a drive assembly.

12. The device in accordance with claim 11 wherein said rotation means is operationally connected to said drive assembly.

13. The device in accordance with claim 1 wherein said first and second vacuum manifolds, conduit, control valve and rotation means are each coaxially aligned with said support shaft axis.

14. The device in accordance with claim 1 wherein second vacuum manifold is laterally spaced apart from said first vacuum manifold.

15. The device in accordance with claim 1 wherein said first and second vacuum manifolds each comprises a plurality of tubular suction shafts.

16. The device in accordance with claim 1 wherein said first suction shaft of said first vacuum manifold and said second suction shaft of said second vacuum manifold each comprise a suction cup.

17. An article-handling device, comprising:
a) a vacuum source providing a vacuum pressure;
b) a stationary support shaft having a central axis;
c) a first vacuum manifold rotatably mounted on said support shaft and comprising one or more tubular suction shafts;
d) a second vacuum manifold rotatably affixed to said first vacuum manifold and comprising one or more tubular suction shafts;
e) a stationary control valve mounted on said support shaft and adapted to i) receive and distribute said vacuum pressure independently to said first and second vacuum manifolds, and ii) provide connectivity with atmospheric pressure;
f) a monolithic vacuum conduit rotatably mounted on said support shaft comprising i) a first plurality of channels to provide separate operational connectivity between said first vacuum manifold and said control valve, and ii) a second plurality of channels to provide separate operational connectivity between said second vacuum manifold and said control valve;
g) a means for rotating each of said first and second vacuum manifolds, and said conduit about said support shaft, wherein said rotation means comprises i) a first plurality of holes through the interior of said rotation means, and ii) a second plurality of holes through the interior of said rotation means; and wherein at least a first suction shaft of said first vacuum manifold is arranged spatially parallel to a first suction shaft of said second vacuum manifold thereby enabling each to independently attract and hold said article when said first and second vacuum manifolds are operationally connected with said vacuum pressure and release said article when said first and second vacuum manifolds are operationally connected with said atmosphere pressure.

18. The device in accordance with claim 17 further comprising a second suction shaft of said first vacuum manifold and a second suction shaft of said second vacuum manifold, wherein said second suction shaft of said first vacuum manifold is positioned substantially parallel to a second suction shaft of said second vacuum manifold thereby enabling each to independently attract and hold said article when said first and second vacuum manifolds are operationally connected with said vacuum pressure and release said article when said first and second vacuum manifolds are operationally connected with said atmosphere pressure.

19. The device in accordance with claim 17 further comprising a third suction shaft of said first vacuum manifold and a third suction shaft of said second vacuum manifold, wherein said third suction shaft of said first vacuum manifold is positioned substantially parallel to said third suction shaft of said second vacuum manifold thereby enabling each to independently attract and hold said article when said first and second vacuum manifolds are operationally connected with said vacuum pressure and release said article when said first and second vacuum manifolds are operationally connected with said atmosphere pressure.

20. The device in accordance with claim 17 wherein said rotation means is operationally synchronized with said control valve.

21. The device in accordance with claim 17 wherein rotation means is positioned between and in a surface-to-surface contact arrangement with both said control valve and said conduit.

22. The device in accordance with claim 17 wherein said first plurality of channels of said conduit are aligned longitudinally with said first plurality of holes through the interior of said rotation means to provide separate communication between said first vacuum manifold and said control valve.

23. The device in accordance with claim 17 wherein said second plurality of channels of said conduit are aligned longitudinally with said second plurality of holes through the interior of said rotation means to provide separate communication between said second vacuum manifold and said control valve.

24. The device in accordance with claim 17 wherein said rotation means comprises a sprocket wheel.

25. The device in accordance with claim 17 further comprising a drive assembly.

26. The device in accordance with claim 25 said rotation means is operationally connected to said drive assembly.

27. The device in accordance with claim 17 wherein said first and second vacuum manifolds, conduit, control valve and rotation means are each coaxially aligned with said support shaft axis.

28. The device in accordance with claim 17 wherein second vacuum manifold is laterally spaced apart from said first vacuum manifold.

29. The device in accordance with claim 17 wherein said first and second vacuum manifolds each comprises a plurality of tubular suction shafts.

30. The device in accordance with claim 17 wherein said first suction shaft of said first vacuum manifold and said second suction shaft of said second vacuum manifold each comprise a suction cup.

\* \* \* \* \*